Figure 5:
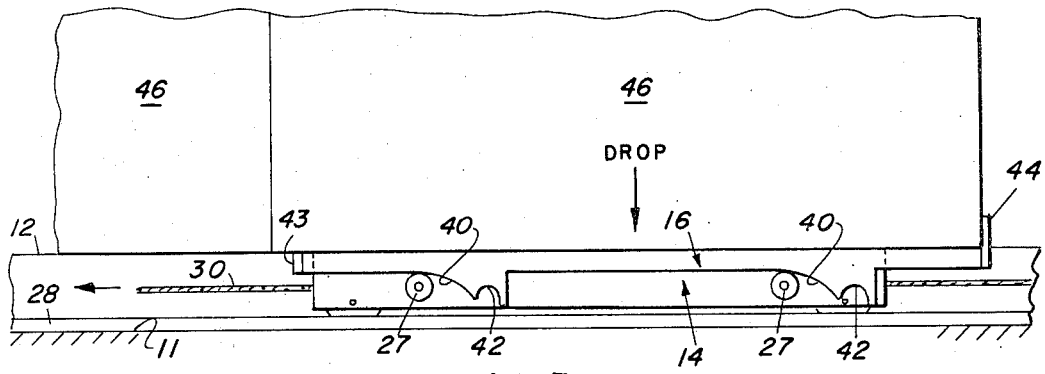

United States Patent [19]  
Lutz

[11] 3,809,268  
[45] May 7, 1974

[54] LOAD-TRANSFER DEVICE
[76] Inventor: David Edward Lutz, 330 Washington Ln., Carlisle, Pa. 17013
[22] Filed: Aug. 30, 1972
[21] Appl. No.: 284,823

[52] U.S. Cl. .......... 214/512, 214/83.24, 214/38 CC, 214/516, 254/5 C
[51] Int. Cl. .............................................. B60p 1/00
[58] Field of Search.... 214/512, 516, 83.24, 38 CD, 214/38 CC; 254/5 C

[56] References Cited
UNITED STATES PATENTS
1,286,861   12/1918   Willer ................................. 254/5 C
3,642,154   2/1972   Duszka ............................... 214/516
3,313,429   4/1967   Cole .............................. 214/83.24 X Primary Examiner—Albert J. Makay
Attorney, Agent, or Firm—Edward E. Dyson; John J. Byrne

[57] ABSTRACT

A load-transfer device primarily useful in loading and unloading trucks or the like comprising a conveyor operating on a principle similar to a walking beam conveyor wherein a load-bearing member is raised vertically to lift a load from a supporting surface and then to transfer the load to another point on the surface. The load-bearing member is raised and lowered by reaction with adjacent loads or an immovable bulwark.

16 Claims, 11 Drawing Figures

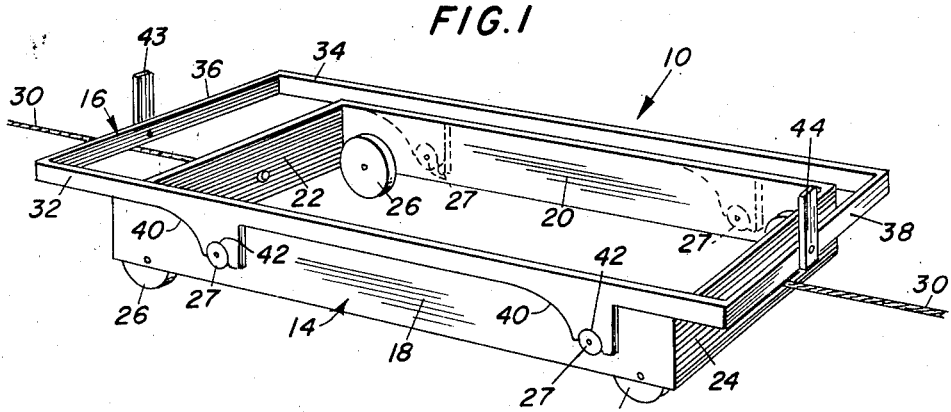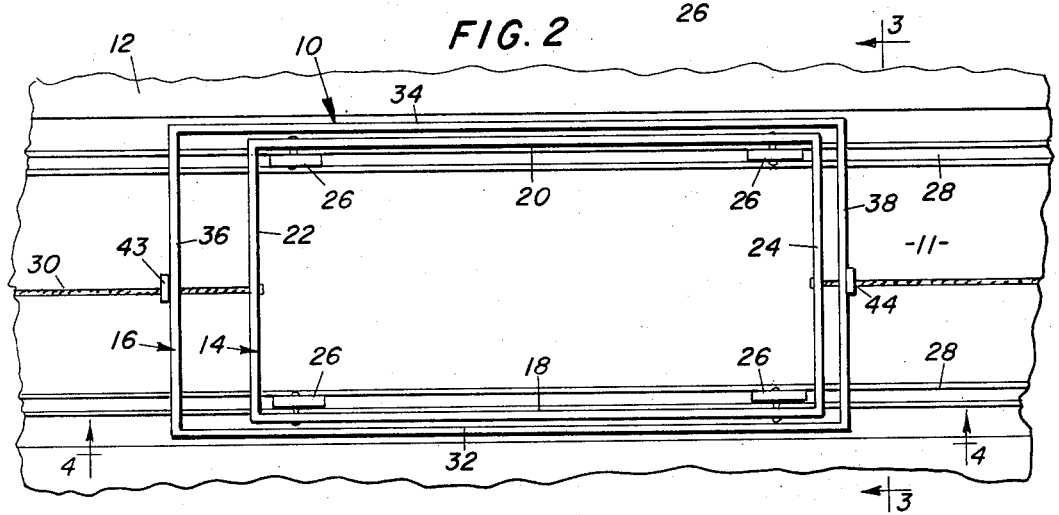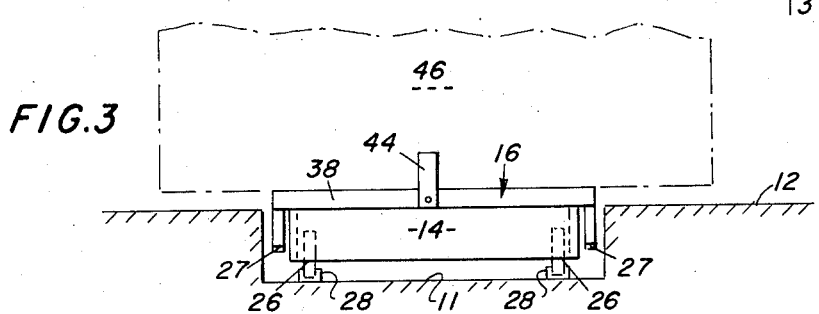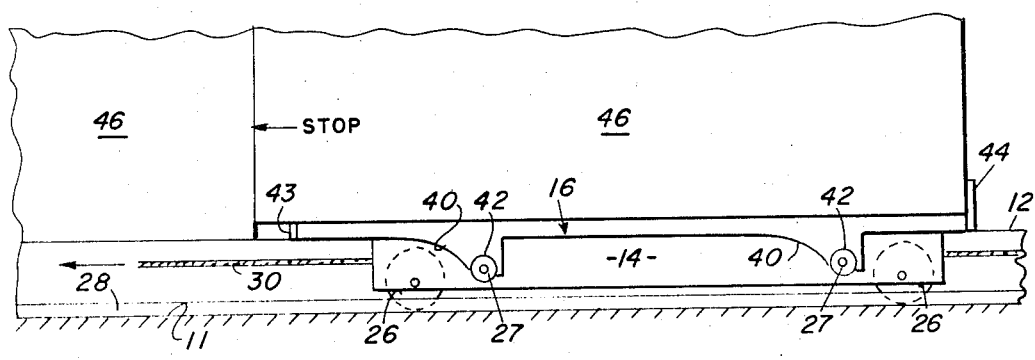

LOAD-TRANSFER DEVICE

This invention relates to a load-transfer device and more particularly to vehicle-mounted loading and unloading devices.

The load-transfer device of this invention generally employs the principal of a walking beam conveyor. A standard walking-beam conveyor generally includes fixed or stationary elongated parallel beams mounted on a supporting surface or framework, and movable parallel beams interspaced with the fixed beams and mounted for movement vertically and longitudinally relative to the fixed beams. When the movable beams are in the lowermost position of their vertical movement path, the upper edges thereof are below the upper edges of the fixed or stationary beams. When they are in the uppermost position of their vertical movement path, the upper edges thereof are above the upper edges of the fixed beam. Therefore, a load normally resting on the fixed or stationary beams is lifted off the stationary beams by the movable beams. When in the raised position, the movable beams are shifted linearly or longitudinally of the fixed beams to thereby advance the load relative to the fixed beams. The movable beams are lowered to again rest the load on the fixed beams. In summary, the movable beams, by their vertical and longitudinal movement, advance a load from one point to another point on the stationary beams. The movable beams are retracted to the starting point while in the lowered position and the cycle is again repeated.

In the above-mentioned conventional walking-beam conveyor arrangement, there are usually two driven members, the intermediate member which raises and lowers the load-supporting member and the load-supporting member which is driven in a reciprocatory path on the intermediate member to move the load the desired distance.

In the device of this invention the entire unit is moved in a reciprocatory path with the load-supporting member being moved to the raised position by a reaction against the load to be transferred or against other suitable stop means which holds the load supporting member stationary while the intermediate member continues its linear movement.

It is an objective of this invention to provide a load-transfer device for vehicles or the like which is of compact design and easily adaptable to existing truck bodies.

It is another objective of this invention to provide a load-transfer device particularly adaptable for use with palletized loads.

It is a further objective of this invention to provide a load-transfer device which can be sold in component form and placed in an existing truck floor without compromising the structural integrity of the vehicle body.

It is another objective of this invention to provide a load-transfer device which is automatic in operation. For example, the principal drive means is provided with a control circuit to automatically reverse the drive once a load has been transferred to a desired point.

It is another objective of the invention to employ a cable drive system and means for sensing an increase in tension in said cable to reverse its direction of movement.

Figure 6:
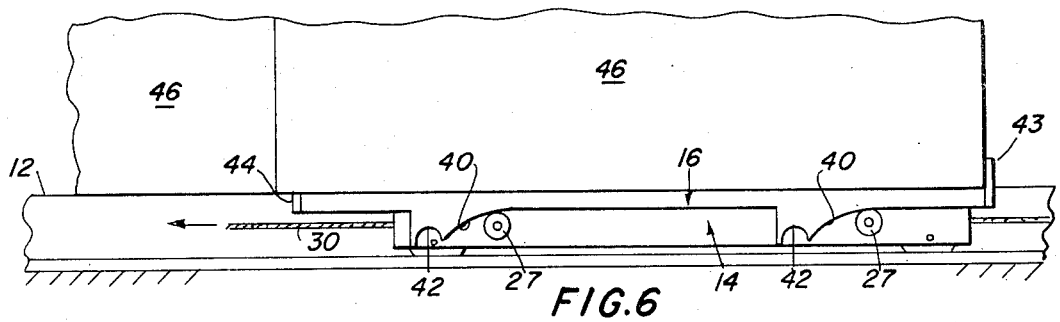
Figure 7:
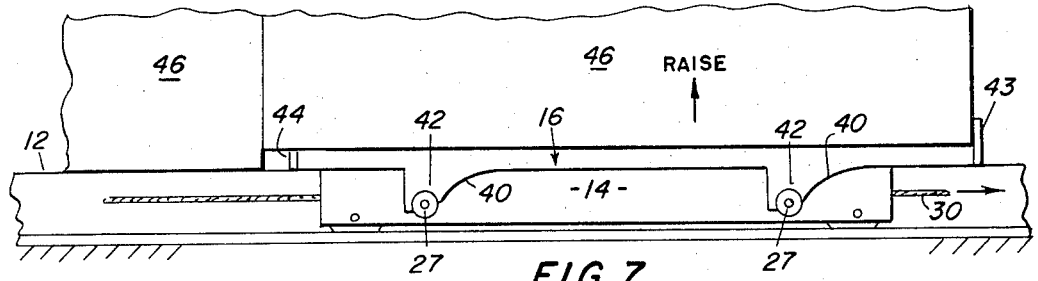
Figure 8:
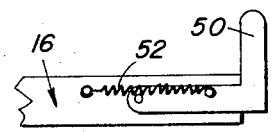
Figure 9:
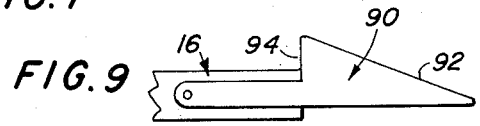
Figure 10:
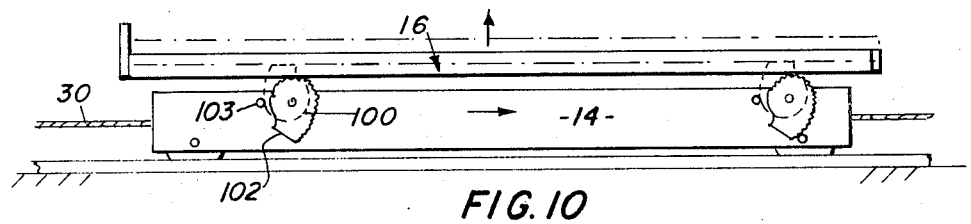
Figure 11:
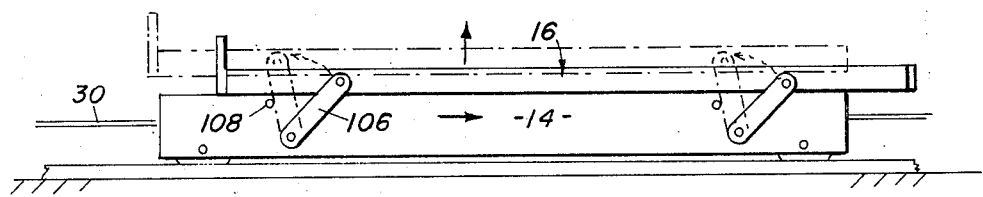

These and other objects of the invention will become more apparent to those skilled in the art by reference to the following detailed description when viewed in light of the accompanying drawings wherein:

FIG. 1 is a perspective view of the load-transfer device of this invention;
FIG. 2 is a plan view of the device of FIG. 1;
FIG. 3 is an end view of the device of FIG. 1;
FIG. 4 is a side view in elevation of the load-transfer device of this invention in the load mode with the load-supporting member in the raised position;
FIG. 5 is a side view in elevation of the load-transfer device of this invention in the load mode with the load-supporting member in the lowered position;
FIG. 6 is a side view in elevation of the load-transfer device of this invention in the unload mode with the load-supporting member in the lowered position;
FIG. 7 is a side view in elevation of the load-transfer device of this invention in the unload mode with the load-supporting device in the raised position;
FIG. 8 is a side view in elevation of another embodiment of the stop means of this invention;
FIG. 9 is a side view in elevation of still another embodiment of the stop means of this invention;
FIG. 10 is a side view in elevation of a modified arrangement for raising and lowering the load-supporting member; and
FIG. 11 is a side view in elevation of another modified arrangement for raising and lowering the load supporting member.

Referring to FIG. 1, the numeral 10 generally indicates the load-transfer device of this invention. Numeral 12 indicates the planar supporting surface which in the preferred embodiment is the floor or bed of the load-bearing section of a truck or the like. The device 10 rides in an elongated recess 11 in the floor and is comprised of essentially two elements, a dolly or carriage 14 and a load-carrying member 16. The dolly or carriage 14 hereinafter will be referred to as the intermediate member since it is disposed between the floor of the recess 11 and the load-supporting member 16.

The intermediate member 14 as shown in FIG. 1 includes two elongated side members 18 and 20 and front and rear transverse end members 22 and 24 connecting the side members 18 and 20 in spaced relationship. It is to be understood that the intermediate member 14 can be formed of a solid sheet of material. The embodiment shown in FIG. 1 is preferred for the conservation of materials and for the reduction in weight. The intermediate member 14 is movably supported on the surface 12 by wheels 26 journalled in the elongated side members 18.

The cable or chain 30 is attached at its free ends to the transverse end members 22 and 24 and is connected intermediate its length to a suitable power means (not shown) such as a reversible rotary motor and pulley or sprocket attached to driven shaft. In lieu of the cable and chain ends being affixed to the transverse end members 22 and 24, an endless chain having cogs thereon receivable in suitable slots or the like on the underside of the intermediate member may be employed. Upon energizing the motor, the intermediate member is caused to move in a rectilinear path in the recess 11.

The load-carrying member 16 also is of a rectangular configuration and is of somewhat larger dimensions than the intermediate member 14 and includes elongated side members 32 and 34 and transversely extending end members 36 and 38 which connect the side members in spaced relationship. A set of rollers 27, of smaller diameter than the wheels 26, are journalled in the side members 18 and 20, a pair on each side.

Inverted ramps 40 depend from the underside of the elongated side members 32 and 34 as shown in FIG. 1. The ramps are located in a position to generally overlie the rollers 27 such that the load-carrying member 16 is supported on the member 14 by means of the engagement of the ramps and rollers. Each of the ramps includes a detent 42 in the form of a depression generally conforming to the outer configuration of the rollers 40. The purpose of the detent is to maintain the article-carrying member 16 in the raised position as shown in FIG. 1. The ramps are provided with stops immediately adjacent the recesses as a safeguard against further movement of the intermediate member relative to the load-supporting member after the roller 27 becomes seated in the recesses.

As can best be seen in FIG. 2, the load-supporting member 16 is of a larger dimension than the intermediate member 14 and when in the lowered position, completely circumscribes the intermediate member. In FIG. 2, the load-supporting member is shown in the raised position and in this position, the distance between the transverse member 36 of the load-carrying member 16 and the transverse member 22 of the intermediate member 14 is at least equal to the length of the ramps 40. As will be explained more fully below, when the load-supporting member is moved to the lowered position, down the ramps, by reason of the load-supporting member engaging a stationary load or the like, the intermediate member will continue to move until the transverse member 22 engages the transverse member 36, the load-supporting member then being in the lowered position and circumscribing the intermediate member 14.

Stops 43 and 44 are pivotally mounted on the ends members 36 and 38. The stops are movable between a raised position, where they will engage a side of a load when the device is moved thereunder, and a lowered position, wherein the device can freely travel under a load. In the alternative, the stops can be mounted as shown in FIG. 8 wherein stop 50 is shown pivotally attached to the schematically illustrated article carrying member 16 and is connected to an over-the-center spring 52 which holds the stop in either the up or down position. If desired, these stops can be kicked up or down by trippers in the supporting floor.

Another embodiment of the stop means is shown in FIG. 9 and includes a retractable one-way stop 90 having a cam surface 92 and a latching surface 94. The stop is pivotally mounted to the load-bearing member 16. It can be seen that for one direction of movement, the direction in which the cam surface is leading, the stop will be pivoted downwardly upon engagement with a load against the biasing action of a spring (not shown) to permit movement of the device beneath a load. In the other direction of movement, however, the latching surface 94 will engage the side of the load and halt the movement of the load-bearing member 16. The advantage of this particular stop is that in the load mode, a load can be placed on the rear of the vehicle without waiting for the return of the device. When the device returns, the stop 90 will engage the load and cam downwardly to permit the device to travel under the load.

When the direction of movement is reversed, the surface 94 will engage the load and hold the member 16 while the member 14 moves toward the front of the vehicle. Accordingly, the load will be raised off of the floor. Of course, stops which can be manually placed in apertures on the ends of the member 16 can be employed.

The load transfer device of this invention is particularly designed to handle palletized loads, schematically illustrated in the drawings. The loads are of a greater width than the recess in which the load-transfer device rides such that when the load-supporting member is in the lowered position, the loads will rest on those positions of the floor adjacent the recess. It is to be understood, however, that other arrangements may be employed for supporting the container when the load-supporting member is in the lowered position. For example, instead of the transfer device riding in the recess, it may ride in trackways positioned on a planar vehicle body floor. In this event, the pallet will be provided with feet to space the load the necessary distance from the surface. Another alternative is the provision of a pair of elongated stationary beams affixed to the floor on either side of the path of travel of the load-transfer device. In this particular instance, a flat-bottomed, footless-type pallet would be employed as with the recess embodiment.

Whn the device is in the down position, the entire assembly with the exception of the stop means 44 can pass freely under the bottom of the container 46 which overlies the recess 11. When the device is inserted under a container and is then moved to the raised position, the container 46 will be lifted off the floor. Stated differently, when in the lowered position, the upper surface of the load-supporting member is below the surface of floor 12. When in the raised position, the surface of the load supporting member is above the surface of the floor 12.

The operation of the load-transfer device of this invention in loading and unloading a vehicle will now be described. FIGS. 4 and 5 show the device in the load mode with the front or closed end of the vehicle being to the left and the open end being to the right. Whether or not the device is in the load or unload mode depends upon the position of the article-supporting member 16 on the intermediate member 14. In other words, by reversing the article-supporting member, the direction of inclination of the ramps is also reversed meaning that the direction in which the article-supporting member must be moved relative to the intermediate member to raise the article-supporting member is also reversed. Referring particularly to FIG. 4, the container 46 is placed on the device when the member 16 is in the raised position at the rear or open end of the truck. The motor means driving the intermediate member 14 is then actuated causing the entire assembly to move in the direction indicated by the arrow in FIG. 4. Note that the stop means 44 is raised at the rear end only and the stop means at the front end of the transverse member 36 is in the down or inactive position. The entire device is moved forward until contact is made with a bulwark or a previously loaded container resting on the floor 12. At this time, because of the stop means 44 no further forward movement will be permitted to the member 16 once the stop engages the load. However, the intermediate member 14 will continue to move toward the front of the truck meaning that the rollers 27 will come out of the recesses or depressions 42 and the member 16 will move down the ramps to the lowered position as shown in FIG. 5. The member 14 will continue to move forward until the transverse member 22 engages the transverse member 36 of member 16. As mentioned earlier, the member 16 circumscribes the member 14 when in the lowered position. Since the member 16 is prevented from moving forward, the member 14 is likewise prevented from moving forward.

After the container has been lowered to the floor, the directional movement of the entire device will be reversed automatically and will move toward the rear of the truck. A stop of some type, not shown, is provided at the end of the truck and engages the end of the member 16 as it moves rearwardly and forces it back up the ramps 40 until the rollers 27 are again seated in the recesses or depressions 22. Another load can then be placed on the member 16 and the loading sequence is repeated. Any suitable means may be employed for automatically reversing the direction of movement of the device once movement thereof has been arrested. An example of such means is a cable tension sensing device which upon sensing a predetermined tension level obtained when the movement of the load-supporting member 16 and the intermediate member 14 is arrested as explained above, will automatically reverse the direction of the cable drive motor through suitable electrical relays or the like. A cable tension sensing system can be used for the other direction of movement; that is, toward the rear of the truck to reverse the direction of the drive motor upon the device making contact with a stop at the rear. If a stop similar to stop 90 is employed on the load-supporting member, or any other type stop which is automatically tripped, a load can be preplaced on the truck at the rear thereof and when the load-transfer device is returned to the rear it will move under the load and the direction of movement of the device will be automatically reversed by means of the cable tension sensing means described above to transfer the load toward the front end of the truck.

In order to unload, the article-carrying member 16 is reversed on the member 14 such that the ramps face in the opposite direction. The entire assembly is then moved under a load 46 to be unloaded and will continue movement until the stop 43 engages the rear end of the seated container. Upon continued movement of the intermediate member 14, the load-supporting member 16 will be forced to the raised position until the rollers are seated in recesses 42. The cable tension sensing system will then automatically reverse direction of movement of the load-transfer device. The container is moved toward the rear until contact is made with a stop at the rear end of a truck such that with continued movement of the intermediate member 14, the article-carrying member 16 will be forced to the lowered position. The load will be seated on the vehicle floor and can be removed by any suitable means such as a forklift truck or the like. When the down position, the upper surface of the device is lower than the surface of floor 12 and hence when again moved ahead it will go under the next load until the stop means hits whereby the device raises, lifts the load and again moves toward the rear.

This invention is directed primarily to the general principal of raising and lowering the load-supporting member by reaction against a stop or another seated load and is not to be limited to the particular arrangement of the elements shown in the preferred embodiment. For example, the ramps may be placed on the intermediate member and the rollers on the load-supporting member or in the alternative, other means for raising the load-supporting member may be employed. Referring specifically to FIGS. 10 and 11, two embodiments of means to raise the load-supporting member are shown. In the embodiment of FIG. 10, the intermediate member 16 is provided with pivotally mounted teardrop cams 100, a pair on each side thereof. The cams each have a flattened section 102 which support the load-supporting member 16 in the raised position. As shown, the device is in the lowered position. When the member 16 engages a load and the forward movement thereof is stopped, the continued movement of the member 14 causes rotation of the cams 100 by means of frictional contact with the underside of member 16. The rotation will continue until the cams hit stops 103 whereupon the flattened sections 102 will be in engagement with the underside of the then raised member 16. The edges of the cams are serrated to promote good frictional contact with the load. In FIG. 11, a parallelogram type arrangement is employed with the member 16 being pivotally attached to the member 14 by means of links 106 each of which is pivotally attached at one end to the load-supporting member 16 and at the other end to the intermediate member 14. The load-supporting member 16 is movable from the down position shown in FIG. 11 to the up position shown in dotted line configuration upon engagement with another load or stop. The pivotal movement of the links 106 are limited by stops 108 which permit the links to travel just past the over-the-center position. Both of the embodiments are provided with load-engaging stops like one of the previously described embodiments. Further, in each of the embodiments of FIGS. 10 and 11, the entire assembly, including member 14, must be reversed to change from the load mode to the unload mode.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

I claim:
1. A load transfer device for use with a stationary supporting surface normally supporting said loads, an intermediate member movable on a subsurface below that of said supporting surface and under said loads, a set of wheels on said intermediate member engaging said subsurface and supporting said intermediate member for movement on said surface, flexible drive means attached to the front and rear of said intermediate member for driving said intermediate member in a linear path on said surface, a set of rollers on said intermediate member, a load-supporting member being supported on said intermediate member by said rollers, ramp means on said load-supporting member, stop means on the front and rear of said load-supporting member and alternately operable for limiting movement of said load-supporting member under said load and for causing said load-supporting member to move up said ramp means upon continued movement of said intermediate member, whereby said load-supporting member is raised generally vertically to lift said load from said supporting surface, and detent means on said ramp members for securing said rollers and maintaining said load-supporting member in the raised position.

2. A load-transfer device as defined in claim 1 wherein said supporting surface is a vehicle bed.

3. A load-transfer device as defined in claim 1 wherein detents are generally depressions in the uppermost portions of said ramp means, said depressions receiving said rollers.

4. A load-transfer device as defined in claim 1 wherein said intermediate means is generally rectangular and comprises a pair of elongated side members and transverse members joining said side members in spaced relationship and said set of wheels comprises a pair of wheels journaled in each side member, and said set of rollers comprising a pair of rollers journaled in each side member.

5. A load-transfer device as defined in claim 4 wherein said load-supporting member is generally rectangular and has front and rear ends and said ramp means comprises two pairs of inverted ramps attached to the underside thereof generally overlying said pairs of rollers, and said stop means comprises retractable vertically extending bars on the ends thereof.

6. A load transfer device for use with a stationary supporting surface normally supporting said loads, said load-transferring device including a carriage movably mounted on a subsurface below said supporting surface and under said loads and a load-supporting member mounted on said carriage, means attached to the front and rear of said carriage for moving said carriage in forward and reverse directions on said subsurface, and interengaging means between said carriage and load-supporting member for raising and lowering said load-supporting member generally vertically relative to said carriage from a position wherein the upper surface of said load-supporting member is below said stationary supporting surface to a position wherein the surface of said load-supporting member is above said stationary supporting surface to lift a load, said interengaging means being actuated to raise and lower said load-supporting member upon engagement of said load supporting member with an obstruction in the path of travel of said carriage to restrain said load-supporting member while said carriage continues its movement.

7. The load transfer device of claim 6 wherein said interengaging means for raising said load supporting member vertically includes a set of rollers on said carriage, said load-supporting member being supported on said carriage by said rollers, ramp means on said load-supporting member, stop means on said load-supporting member for limiting movement of said load-supporting member for limiting movement under said load and for causing said load-supporting member to move up on said ramp means upon continued movement of said intermediate member, whereby said load-supporting member is raised generally vertically to lift said load from said supporting surface, and detent means on said ramp members for maintaining said load-supporting member in the raised position.

8. A load-transfer device as defined in claim 7 wherein detents are generally semicircular depressions in the uppermost portions of said ramp means, said depressions receiving said rollers.

9. A load-transfer device as defined in claim 7 wherein said carriage is generally rectangular and comprises a pair of elongated side members and transverse members joining said side members in spaced relationship and including surface-engaging wheels journaled in said side members, and said set of rollers comprising a pair of rollers journaled in said side members.

10. A load-transfer device as defined in claim 9 wherein said load-supporting member is generally rectangular and has front and rear ends and said ramp means comprises two pairs of inverted ramps attached to the underside thereof generally overlying said pairs of rollers, and said stop means comprises retractable vertically extending bars on the ends thereof.

11. The load transfer device of claim 6 wherein said interengaging means for raising said load-supporting member vertically includes a plurality of tear-drop cams rotatably mounted on said carriage, said load-supporting member being supported on said cams and in frictional engagement therewith, stop means on said load supporting member for limiting movement of said load-supporting member under said load and for causing said cams to rotate by said frictional engagement to raise said load-supporting member relative to said carriage upon continued movement of the latter.

12. The load transfer device of claim 6 wherein said means for raising said load-supporting member includes a pivotal linkage arrangement connecting said load supporting member to said carriage in the manner of a parallelogram for vertical movement relative to said carriage, stop means on said load-supporting member for limiting movement of said load-supporting member under said load and for causing said load-supporting member to move up on said linkage arrangement upon continued movement of said intermediate member, whereby said load-supporting member is raised generally vertically to lift said load from said supporting surface.

13. The load transfer device of claim 7 wherein said stop means comprises a lever pivotally attached to each end of said load-supporting member and each movable between a first position below the upper surface of said load-supporting member and a second position above the upper surface of said load-supporting member.

14. The load transfer device of claim 13 and including an over-the-center spring for holding said pivoted stop in the first or second position.

15. The load transfer device of claim 13 and including means for biasing said stop to said second position, a cam surface on said stop and a latching surface on said stop, said stop being moved to said dirst position upon engagement of said cam surface with an adjacent load.

16. The load transfer device of claim 6 wherein said moving means comprises a flexible cable attached to the front and rear of said carriage.

* * * * *